May 5, 1931.                M. GALE                1,803,668
VEHICLE BODY CONSTRUCTION
Filed Feb. 20, 1928
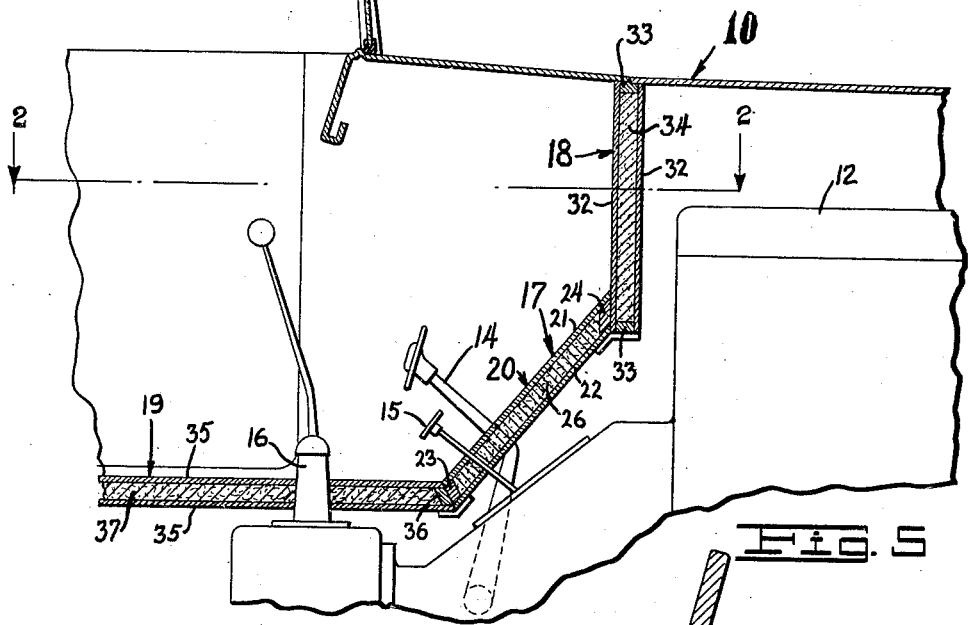
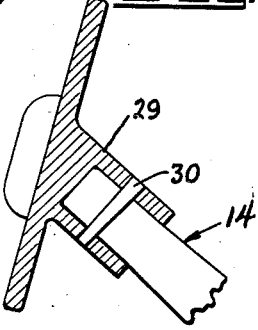
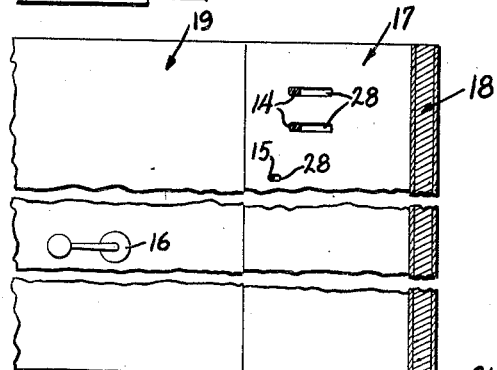
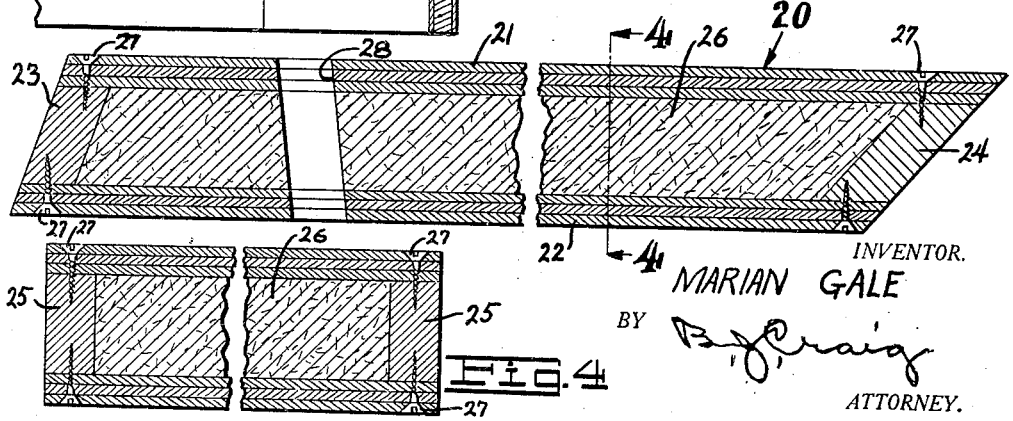
INVENTOR.
MARIAN GALE
BY
ATTORNEY.

Patented May 5, 1931

1,803,668

UNITED STATES PATENT OFFICE

MARIAN GALE, OF LOS ANGELES, CALIFORNIA

VEHICLE BODY CONSTRUCTION

Application filed February 20, 1928. Serial No. 255,565.

This invention relates to improvements in automobile floor boards.

The general object of this invention is to provide a heat insulated floor board for automobiles which is adapted to prevent the engine from heating the driver's compartment.

Other objects of this invention will be apparent from the following description taken in connection with the accompanying drawing, wherein:

Fig. 1 is a fragmentary section through an automobile embodying the features of my invention.

Fig. 2 is a section taken on line 2—2 of Fig. 1.

Fig. 3. is an enlarged section through the inclined floor board shown in Fig. 1.

Fig. 4 is a section taken on line 4—4 of Fig. 3, and

Fig. 5 is an enlarged section through a foot pedal such as is preferably used in connection with my improved floor board.

Referring to the drawing by reference characters I have indicated a portion of an automobile to which my invention is applied at 10. As shown, this automobile includes an engine 12, clutch and brake pedals 14, an accelerator pedal 15 and a transmission gear shift lever housing 16.

In the accompanying drawing I have indicated my invention generally at 17. My invention as shown includes the transverse portion 18, the floor portion 19 and an inclined portion 20. Each portion preferably comprises top and bottom members 21 and 22 spaced apart by end members 23, 24 and by side members 25. The space between the top, bottom, side and end members is occupied by a block 26 which is preferably made of poor conductor of heat such as molded asbestos.

The inclined portion 20 when in an operative position as shown in Fig. 1 is usually disposed at an angle and the ends 23 and 24 are preferably shaped so that they fit snugly against the portion 18 and the floor 17.

The top and bottom members 21 and 22 are preferably made of three or more ply wood as shown in Figs. 3 and 4, and may be secured to the ends 23 and 24 in any suitable manner as by screws 27.

The ends 23 and 24 are preferably formed of a single thickness of wood as shown.

Where operating members such as the foot pedals 14 and the accelerator pedal 15 are designed to extend through the floor board 19 I provide apertures 28 which are preferably no larger than is absolutely necessary to allow of the free actuation of the devices which extend therethrough.

In case the heads of the foot pedals 14 are not made detachable, I sever the heads from the remaining of the pedals and weld thereto a socket 29 in which I position the end of the pedals 14 and secure them to the socket 29 as by a tapered pin 30 as shown in Fig. 5.

The inclined portion 20 may be made to replace the standard floor boards of cars and may be used alone or may be combined with portions 18 and 19 or they may be made as standard equipment on new cars. When a new car includes my invention as standard equipment the portions 18, 19 and 20 are all preferably constructed alike, as shown in Fig. 1.

As shown, the portion 18 comprises members 32 spaced apart by side members 33 and having a molded block of asbestos 34 positioned in the space formed by the members 32 and 33.

The floor 19 is shown as comprising members 35 spaced apart by side members 36 and having a molded block of asbestos 37 positioned in the space formed by the members 35 and 36.

In the summer my improved floor board 19 will keep the heat from the engine from entering the operator's compartment and in the winter it will keep the cold air from entering the operator's compartment from the bottom, so that under all driving conditions the operator will be comfortable.

When the floor 19 and the partition 18 as well as the portion 20 are constructed as described the operator's compartment will be better insulated from the heat and cold than if the portions 18 and 19 are of usual construction, but with the portion 20 only using my invention there is a marked difference in the temperature in the portion of the vehicle adjacent to the controls.

From the foregoing description it will be apparent that I have provided an improved vehicle body construction which is simple in construction and highly efficient in use.

Having thus described my invention, I claim:

1. For use in a vehicle, an insulated board comprising spaced top and bottom members, end and side members secured to said top and bottom members, said top and bottom members each being formed of a plurality of pieces of wood veneer secured together, said end and side members each being formed of a single piece of wood and being of greater thickness than said top and bottom members, the space between said top, bottom, end and side members being filled with asbestos.

2. In combination with an automobile body, a floor board comprising spaced top and bottom members, end and side members secured to said top and bottom members, said top and bottom members each being formed of a plurality of pieces of wood veneer secured together, said end and side members each being formed of a single piece of wood and being of greater thickness than said top and bottom members, a filling of asbestos between said top, bottom, end and side members and a plurality of apertures through said top, bottom and asbestos.

In testimony whereof, I hereunto affix my signature.

MARIAN GALE.